United States Patent
Sokolov et al.

(10) Patent No.: US 6,934,726 B2
(45) Date of Patent: Aug. 23, 2005

(54) STORING AND RETRIEVING OF FIELD DESCRIPTORS IN JAVA COMPUTING ENVIRONMENTS

(75) Inventors: Stephan Sokolov, Fremont, CA (US); David Wallman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 614 days.

(21) Appl. No.: 09/886,536

(22) Filed: Jun. 20, 2001

(65) Prior Publication Data

US 2002/0199176 A1 Dec. 26, 2002

(51) Int. Cl.$^7$ .............................................. G06F 17/30
(52) U.S. Cl. ....................................... 707/206; 707/101
(58) Field of Search ............................... 707/3, 4, 101, 707/100, 102, 103 R, 103 Y, 206; 709/1; 711/6; 712/226; 717/100, 110, 116, 118, 128, 131, 139, 148, 154, 162, 173

(56) References Cited

U.S. PATENT DOCUMENTS

| | | | | |
|---|---|---|---|---|
| 6,003,038 A | * | 12/1999 | Chen ...................... | 707/103 R |
| 6,026,485 A | * | 2/2000 | O'Connor et al. .......... | 712/226 |
| 6,093,216 A | * | 7/2000 | Adl-Tabatabai et al. .... | 717/128 |
| 6,260,187 B1 | * | 7/2001 | Cirne ........................ | 717/110 |

OTHER PUBLICATIONS

Lindholm et al, "The Java™ Virtual Machine Specification", (Sep. 1996), Sun Microsystems, Inc., Chapters 1–10 (173 pp.).

* cited by examiner

Primary Examiner—Apu M Mofiz
(74) Attorney, Agent, or Firm—Beyer Weaver & Thomas, LLP

(57) ABSTRACT

Improved techniques for storing and retrieving field descriptors in Java computing environments are disclosed. The techniques can be used to implement garbage collection for Java programs in a manner that is more efficient, especially for systems with limited resources (e.g., embedded systems). A reference identifier suitable for use by a Java virtual machine is disclosed. The reference identifier is associated with a Java object and can be stored in the internal class representation associated with the Java object at load time. Moreover, the reference identifier can be used at runtime to quickly determine whether a field of the associated Java object is a reference to another Java object. As a result, the amount of processing conventionally performed at runtime is reduced. This, in turn, can improve the runtime performance of Java virtual machines, especially those operating with limited resources (e.g., embedded systems).

19 Claims, 4 Drawing Sheets

STORING AND RETRIEVING OF FIELD DESCRIPTORS IN JAVA COMPUTING ENVIRONMENTS

BACKGROUND OF THE INVENTION

The present invention relates generally to object-based high level programming environments, and more particularly, to storing and retrieving of field descriptors in Java computing environments.

Recently, the Java programming environment has become quite popular. The Java programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation.

The Java virtual machine is commonly implemented in software by means of an interpreter for the Java virtual machine instruction set but, in general, may be software, hardware, or both. A particular Java virtual machine implementation and corresponding support libraries together constitute a Java runtime environment.

Computer programs in the Java programming language are arranged in one or more classes or interfaces (referred to herein jointly as classes or class files). Such programs are generally platform, i.e., hardware and operating system, independent. As such, these computer programs may be executed without modification on any computer that is able to run an implementation of the Java runtime environment.

Object-oriented classes written in the Java programming language are compiled to a particular binary format called the "class file format." The class file includes various components associated with a single class. These components can be, for example, methods and/or interfaces associated with the class. In addition, the class file format can include a significant amount of ancillary information that is associated with the class. The virtual machine loads the class file and internally represents the information as an "an internal class representation". The class file format (as well as the general operation of the Java virtual machine) is described in some detail in *The Java Virtual Machine Specification, Second Edition*, by Tim Lindholm and Frank Yellin, which is hereby incorporated herein by reference.

As an object-oriented programming language, Java utilizes the programming concept known as an object. In the Java programming environment, Java objects are created (instantiated) from Java classes. Typically, Java objects are stored in a heap memory portion (heap). To illustrate, FIG. 1 depicts a computing environment 100 including a heap memory portion 102 suitable for storing Java objects. As shown in FIG. 1, various Java objects, for example, objects $O_1, O_2, O_3, O_4, O_5$ and $O_6$ can be stored in the heap memory portion 102. A Java object in the memory portion 102, for example, Java object $O_3$, can include a reference to its class, as well as one or more other fields describing data (e.g., variables) associated with the object. The Java object $O_3$ can also include references to other Java objects, for example, Java objects $O_4$ and $O_5$, which are also stored in the heap memory portion 102.

Java objects are typically created in the heap memory portion 102 when they are instantiated. After a Java object has been instantiated, it can be referenced from various points in the Java program. For example, the object $O_3$ can be referenced by a local variable 104 of the Java program. During the execution time of the Java program, as depicted in FIG. 1, the local variable 104 can be on an execution stack 106 in a stack frame portion 108. The stack frame portion 108 represents the stack frame for a method associated with the local variable 104. The stack frame portion 108 is typically placed on the execution stack 106 when the associated method is invoked.

In addition to the local variables associated with the method, the stack frame portion 108 also includes an operand stack portion 110 suitable for placing various operands on the execution stack 106. In the Java programming environment, these operands are placed on the operand stack portion 110 of the execution stack 106 in order to execute the Java method associated with the stack frame 108. As is known to those skilled in the art, these operands can be references to objects stored in the heap memory portion 102, e.g., an operand 112 referencing the Java object $O_3$.

As is known to those skilled in the art, there may be a need to identify and track references to Java objects for various reasons. For example, during the course of the execution of Java programs, some of the objects in the heap memory portion 102 are no longer needed (i.e., become "dead objects" which are no longer reachable by the Java program). Accordingly, it is desirable to identify the "dead" objects in the heap memory portion 102 and remove them from the heap. This operation can be referred to as "garbage collection."

To perform garbage collection for Java programs, there is a need to identify references to Java objects from various "root points." The root points include references on the execution stack and static variables. As noted above, a Java object can reference other Java objects. In other words, one or more fields of the Java object may reference other Java objects which may, in turn, have fields that also reference Java objects. This means that there is a need to determine whether the fields of Java object are references to other Java objects.

To accomplish this, the type descriptor for the fields have to be located and accessed. Then there is a need for more processing to determine whether a given field is a reference to a Java object, since each type descriptor can be a reference. It should be noted that locating and accessing type descriptors are performed at run time (e.g., by a garbage collector). In some cases, these operations have to be performed again and again during the execution of the program for the same Java object. Thus, conventionally, significant processing power and time has to be devoted to repeatedly locate the type descriptors and determine which one of the fields are references to Java objects. This can have serious effects on the runtime performance of virtual machines, especially those operating with limited resources (e.g., embedded systems).

In view of the foregoing, alternative techniques for storing and retrieving Java field descriptors are needed.

SUMMARY OF THE INVENTION

Broadly speaking, the present invention relates to improved techniques for storing and retrieving field descriptors in Java computing environments. As will be appreciated, the techniques can be used in a variety of applications. For example, the techniques can be used to implement garbage collection for Java programs in a manner that is more efficient, especially for systems with limited resources (e.g., embedded systems).

In accordance with one aspect of the invention, a reference identifier suitable for use by a Java virtual machine is disclosed. As such, the reference identifier is stored in an internal class representation in the virtual machine. As will be appreciated by those skilled in the art, the reference identifier is associated with a Java object and can be stored in the internal class representation associated with the Java object at load time.

Moreover, the reference identifier can be used at runtime to quickly determine whether a field of the associated Java object is a reference to another Java object. As a result, the amount of processing conventionally performed at runtime is reduced. This, in turn, can improve the runtime performance of Java virtual machines, especially those operating with limited resources (e.g., embedded systems).

The invention can be implemented in numerous ways, including as a method, an apparatus, a computer readable medium, and a database system. Several embodiments of the invention are discussed below.

As an internal class representation suitable for use by a Java virtual machine, one embodiment of the invention includes a reference identifier having one or more entries. Each of the one or more entries correspond to a field of a Java object and can be used to indicate whether corresponding fields of the Java object is a reference to another Java object.

As a method for generating a reference identifier for a Java object, one embodiment of the invention includes the acts of: reading a class file associated with a Java object; identifying fields of the Java object that are references; and allocating a reference identifier for the Java object. The reference identifier indicates which fields of the Java object are references.

As a method for determining whether a field of a Java object is a reference to another Java object, one embodiment of the invention includes the acts of: identifying the internal class representation for the Java object, identifying a reference indicator in the internal class representation; reading a portion of the reference indicator that represents the field of the Java object, and determining whether the value stored in the portion of the reference indicator is equal to a predetermined value.

As a computer readable media including computer program code for an internal class representation suitable for use by a Java virtual machine, one embodiment of the invention includes computer program code for a reference identifier having one or more entries. Each of the one or more entries correspond to a field of a Java object and can be used to indicate whether corresponding fields of the Java object is a reference to another Java object.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The present invention pertains to improved techniques for storing and retrieving field descriptors in Java computing environments. As will be appreciated, the techniques can be used in a variety of applications. For example, the techniques can be used to implement garbage collection methods for Java programs in a manner that is more efficient, especially for systems with limited resources (e.g., embedded systems).

In accordance with one aspect of the invention, a reference identifier suitable for use by a Java virtual machine is disclosed. As such, the reference identifier is stored in an internal class representation in the virtual machine. As will be appreciated by those skilled in the art, the reference identifier is associated with a Java object and can be stored in the internal class representation associated with the Java object at load time. Moreover, the reference identifier can be used at runtime to quickly determine whether a field of the associated Java object is a reference to another Java object. As a result, the amount of processing conventionally performed at runtime is reduced. This, in turn, can improve the runtime performance of Java virtual machines, especially those operating with limited resources (e.g., embedded systems).

Embodiments of the invention are discussed below with reference to FIGS. 2–4. However, those skilled in the art will readily appreciate that the detailed description given herein with respect to these figures is for explanatory purposes only as the invention extends beyond these limited embodiments.

Figure 1:
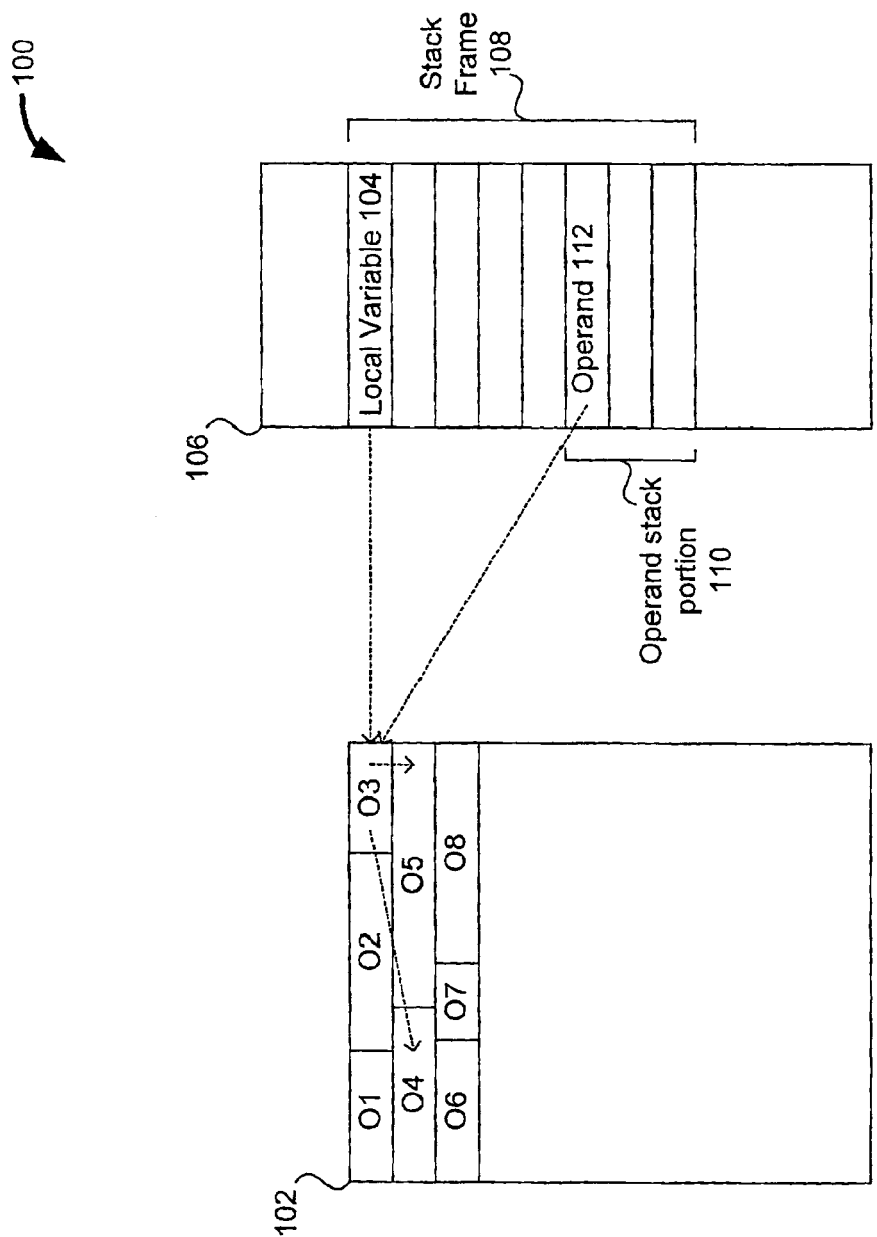
FIG. 1 depicts a computing environment including a heap memory portion suitable for storing Java objects.
Figure 2:
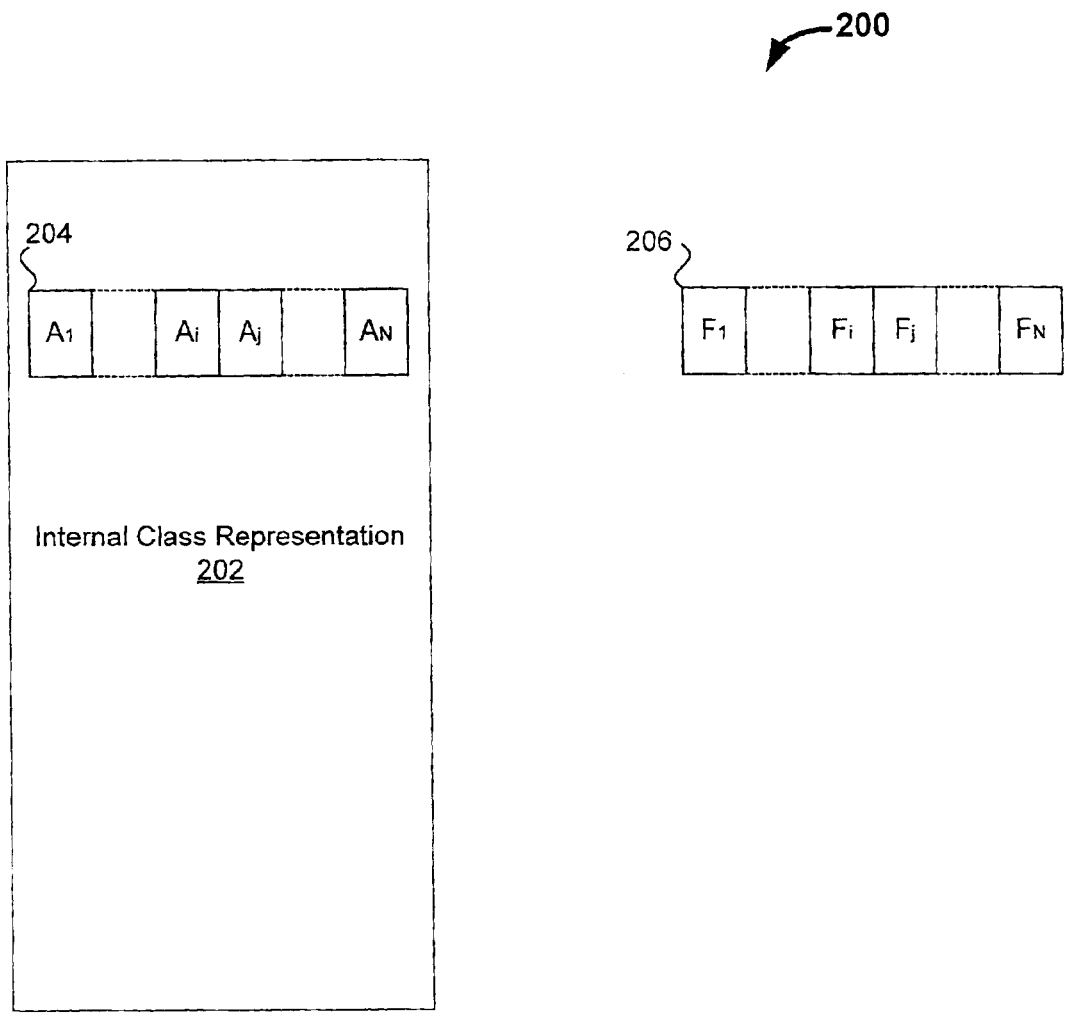
FIG. 2 illustrates a Java computing environment in accordance with one embodiment of the invention.

FIG. 2 illustrates a Java computing environment 200 in accordance with one embodiment of the invention. The computing environment 200 includes an internal class representation 202 typically stored in a Java virtual machine. The internal class representation 202 is associated with Java object 206 having one or more fields $F_1$–$F_N$, where F is a positive integer.

As shown in FIG. 2, the internal class representation 202 includes a reference identifier 204 which has one or more components $A_1$–$A_N$, where N is a positive integer. In the described embodiment, the reference identifier 204 is an N byte array of bytes. As such, each of the components $A_1$–$A_N$ is a byte which can be used to indicate whether a corresponding field of the Java object 206 is a reference to a Java object. For example, bytes $A_i$ and $A_j$ of the reference identifier 204 respectively represent fields $F_I$ and $F_J$ of the Java object 206.

Each of the bytes $A_i$ and $A_j$ of the reference identifier 204 can be set to a predetermined value, for example, the integer 1, to indicate that the corresponding field of the Java object 206 is a reference to a Java object. Similarly, another predetermined value, for example, zero, can be used to indicate that the corresponding field of the Java object 206 is not a reference to a Java object. In this way, the reference identifier 204 can used to determine whether various fields of a Java object are references to other Java objects.

Moreover, the reference identifier 204 can be generated once at load time to allow quick and efficient access to this information during runtime. This means that, in comparison to conventional approaches, there is less processing time required at runtime to determine whether fields of Java objects are references. This, in turn, can significantly enhance the runtime performance of virtual machines, especially those operating with relatively limited resources (e.g., embedded systems). It should be noted that the array organization of the reference identifier 204 provides a very efficient organization which allows quick access to information. For example, with an array implementation, it is possible to quickly determine whether a particular field is a reference since any particular field in the array can be accessed quickly by using the appropriate index.

Figure 3:
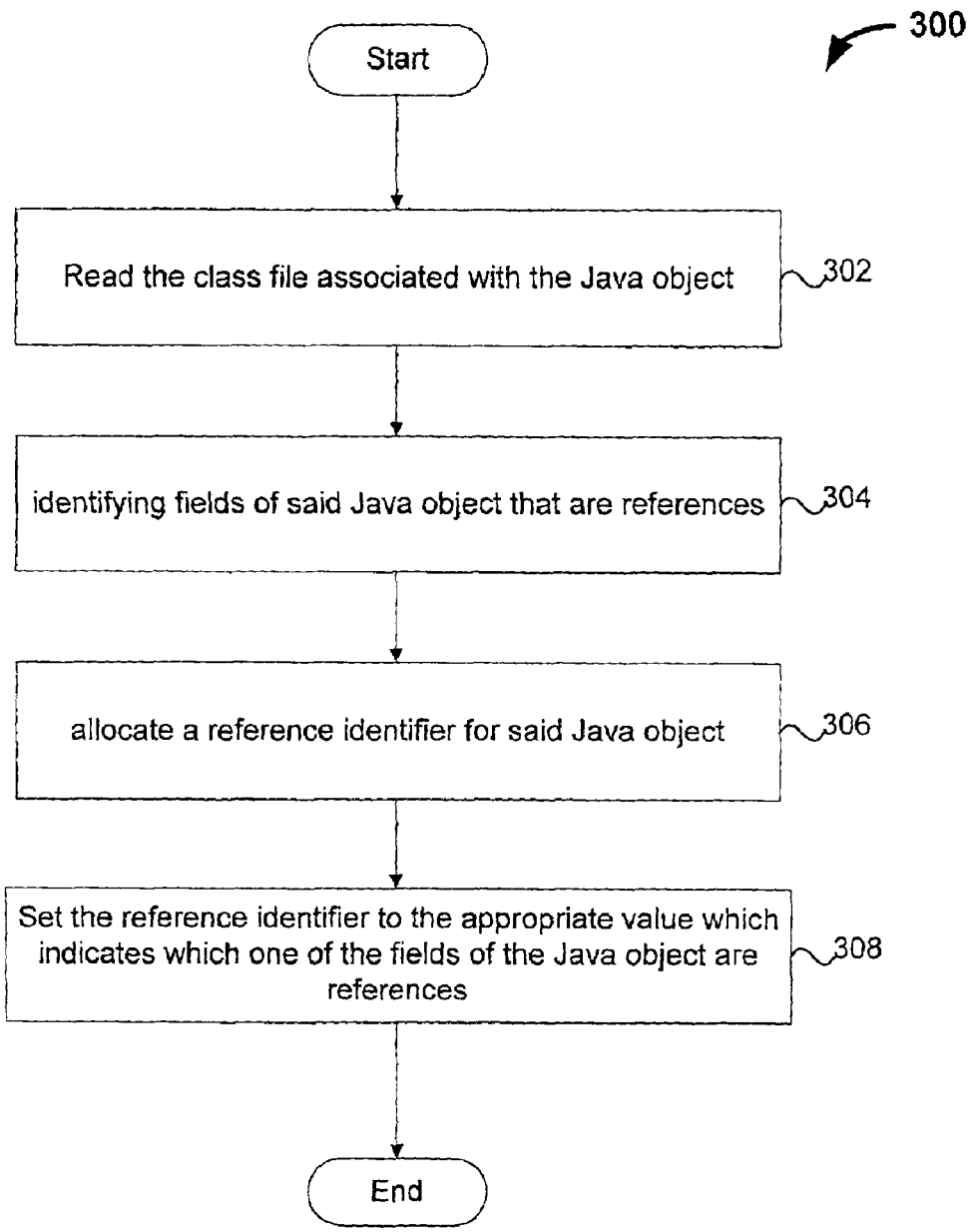
FIG. 3 illustrates a method for generating a reference identifier in accordance with one embodiment of the invention.
Figure 4:
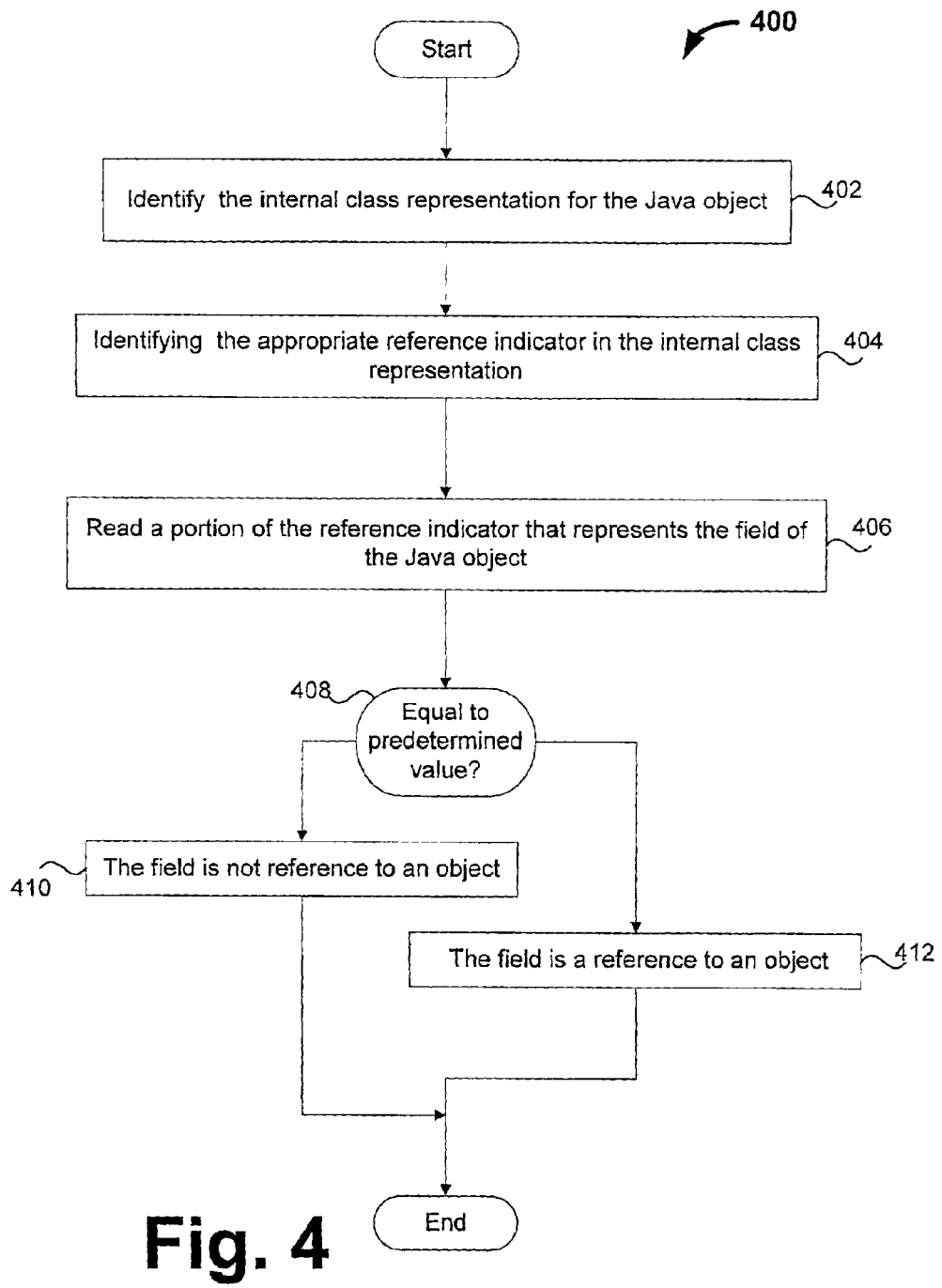
FIG. 4 illustrates a method for determining whether one of the fields of a Java object is a reference.

FIG. 3 illustrates a method 300 for generating a reference identifier in accordance with one embodiment of the invention. As will be appreciated, the method 300 can be implemented by a virtual machine to generate a reference identifier at load time (i.e., when the class file is read and the corresponding internal class representation is generated by the virtual machine). Initially, at operation 302, the class file which is associated with a Java object is read. Next, at operation 304, fields of the Java object that are references are identified. Thereafter, at operation 306, a reference identifier is allocated for the Java object. Finally, at operation 308, the reference identifier is set to the appropriate value which indicates which one of the fields of the Java object are references.

As noted above, a reference identifier can be used to quickly determine at runtime which one of the fields of a Java object are references. FIG. 4 illustrates a method 400 for determining whether one of the fields of a Java object is a reference. Initially, at operation 402, the internal class representation for the Java object is identified. Next, at operation 404, the appropriate reference indicator in the internal class representation is identified. Thereafter, at operation 406, a portion of the reference indicator that represents the field of the Java object is read. As noted above, the portion of the indicator that has a value that can be used to indicate whether the corresponding field of the Java object is a reference. Accordingly, at operation 408, the value indicated by the portion of the reference indicator is compared with a predetermined value (e.g., the integer 1). If it is determined at operation 408 that the value indicated by the portion of the reference indicator is not equal to the predetermined value, it is determined at operation 410 that the field of the Java object is not a reference. The method 400 ends following operation 410. However, if it is determined at operation 408 that the value indicated by the portion of the reference indicator is equal to the predetermined value, it is determined at operation 412 that the field of the Java object is a reference. The method 400 also ends following operation 412.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer implemented method for determining whether a field of a Java object is a reference to another Java object, said method comprising:

reading a class file associated with a Java object;

identifying fields of said Java object that are references;

allocating a reference identifier for said Java object, wherein said reference identifier has one or more entries and each of said one or more entries correspond to a field of said Java object, and wherein each of said one or more entries can be used to indicate whether a corresponding field of said Java object is a reference to another Java object;

initializing said reference identifier to indicate which fields of said Java object are references;

identifying an internal class representation for said Java object;

identifying a reference identifier in said internal class representation;

reading a portion of said reference identifier that represents said field of said Java object; and determining whether the value stored in said portion of said reference identifier is equal to a predetermined value.

2. A method as recited in claim 1, wherein said method is performed by a Java virtual machine at runtime.

3. A method as recited in claim 1, wherein said reference identifier is an array of bytes; and wherein the size of said reference identifier is the same as the number of fields of said Java object.

4. A method as recited in claim 3, wherein said predetermined value can be 1 or zero.

5. A method as recited in claim 1, wherein said predetermined value can be 1 or zero.

6. A method as recited in claim 1, wherein said array of bytes is allocated and initialized during load time.

7. A method as recited in claim 1, wherein said identifying of said internal class representation is performed at runtime.

8. A computer readable medium including computer program code for determining whether a field of a Java object is a reference to another Java™ object, said computer readable medium comprising:

computer code for reading a class file associated with a Java object;

computer code for identifying fields of said Java object that are references;

computer code for allocating a reference identifier for said Java object, wherein said reference identifier has one or more entries and each of said one or more entries correspond to a field of said Java object, and wherein each of said one or more entries can be used to indicate whether a corresponding field of said Java object is a reference to another Java object;

computer code for initializing said reference identifier to indicate which fields of said Java object are references;

computer code for identifying an internal class representation for said Java object;

computer code for identifying a reference identifier in said internal class representation;

computer code for reading a portion of said reference identifier that represents said field of said Java object; and computer code for determining whether the value stored in said portion of said reference identifier is equal to a predetermined value.

9. A computer readable medium as recited in claim 8, wherein said method is performed by a Java virtual machine at runtime.

10. A computer readable medium as recited in claim 8, wherein said reference identifier is an array of bytes; and wherein the size of said reference identifier is the same as the number of fields of said Java object.

11. A computer readable medium as recited in claim 8, wherein said predetermined value can be 1 or zero.

12. A computer readable medium as recited in claim 11, wherein said predetermined value can be 1 or zero.

13. A computer readable medium as recited in claim 8, wherein said array of bytes is allocated end initialized during load time.

14. A computer readable medium as recited in claim 8, wherein said identifying of said internal class representation is performed at runtime.

15. A virtual machine for determining whether a field of a Java object is a reference to another Java object, wherein said virtual machine is capable of:

reading a class file associated with a Java object;

identifying fields of said Java object that are references;

allocating a reference identifier for said Java object; wherein said reference identifier has one or more entries and each of said one or more entries correspond to a field of said Java object, and wherein each of said one or more entries can be used to indicate whether a corresponding field of said Java object is a reference to another Java object;

initializing said reference identifier to indicate which fields of said Java object are references;

identifying an internal class representation for said Java object;

identifying a reference identifier in said internal class representation;

reading a portion of said reference identifier that represents said field of said Java object; and determining whether the value stored in said portion of said reference identifier is equal to a predetermined value.

16. A virtual machine as recited in claim 15, wherein said reference identifier is an array of bytes; end wherein the size of said reference identifier is the same as the number of fields of said Java object.

17. A virtual machine as recited in claim 15, wherein said predetermined value can be 1 or zero.

18. A virtual machine as recited in claim 15, wherein said array of bytes is allocated and initialized during load time.

19. A virtual machine as recited in claim 15, wherein said identifying of said internal class representation is performed at runtime.

* * * * *

UNITED STATES PATENT AND TRADEMARK OFFICE
CERTIFICATE OF CORRECTION

PATENT NO. : 6,934,726 B2
DATED : August 23, 2005
INVENTOR(S) : Sokolov et al.

It is certified that error appears in the above-identified patent and that said Letters Patent is hereby corrected as shown below:

<u>Column 7,</u>
Line 4, change "end" to -- and --.

<u>Column 8,</u>
Line 2, change "end" to -- and --.

Signed and Sealed this

Twenty-fourth Day of January, 2006

JON W. DUDAS
*Director of the United States Patent and Trademark Office*